Figure 1:
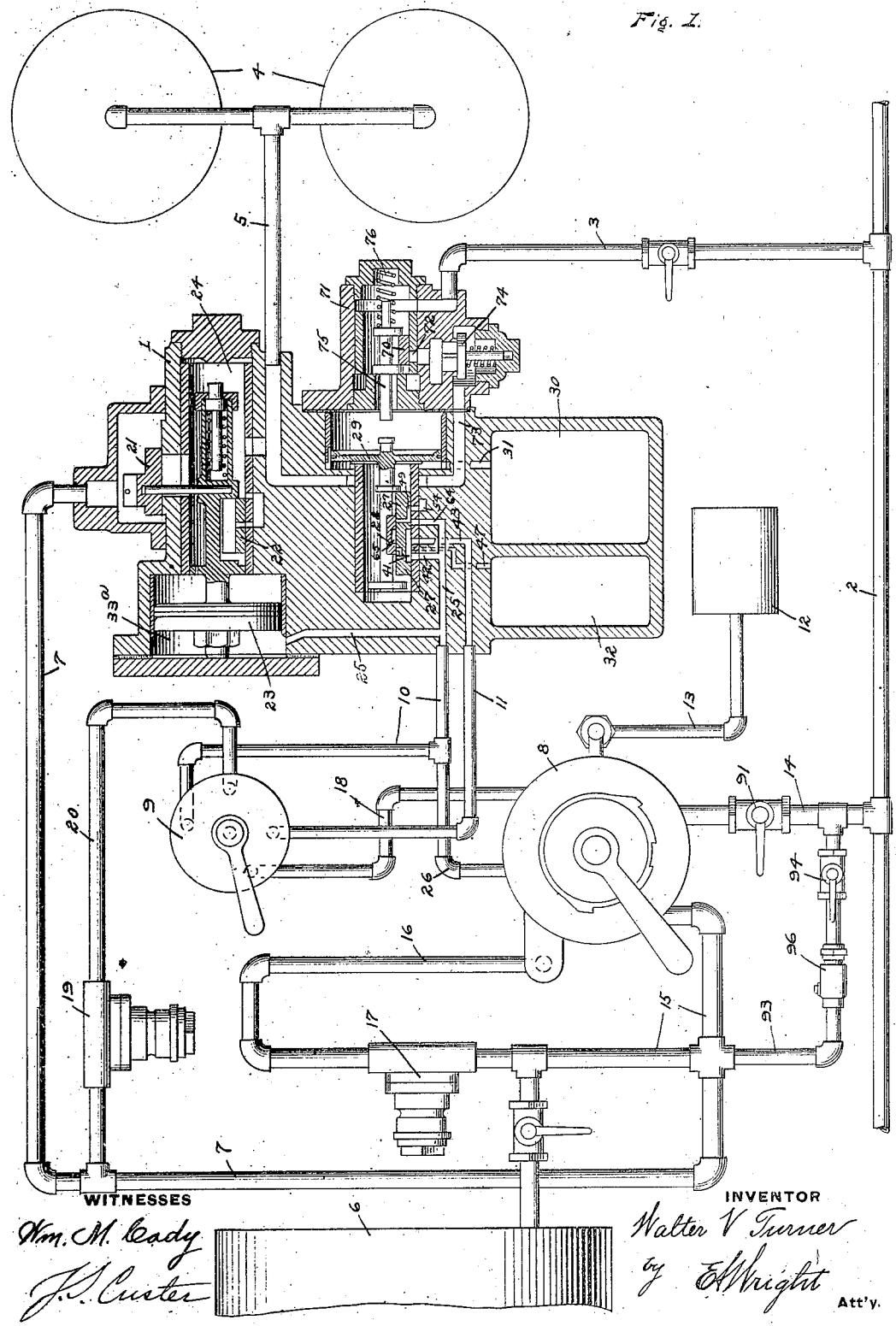

W. V. TURNER.
FLUID PRESSURE BRAKE FOR LOCOMOTIVES.
APPLICATION FILED NOV. 8, 1907.

1,130,448.  
Patented Mar. 2, 1915.  
4 SHEETS—SHEET 1.

WITNESSES  
Wm. M. Cady  
J. S. Custer

INVENTOR  
Walter V. Turner  
by E. Wright  
Att'y.

W. V. TURNER.
FLUID PRESSURE BRAKE FOR LOCOMOTIVES.
APPLICATION FILED NOV. 8, 1907.
1,130,448.
Patented Mar. 2, 1915.
4 SHEETS—SHEET 2.
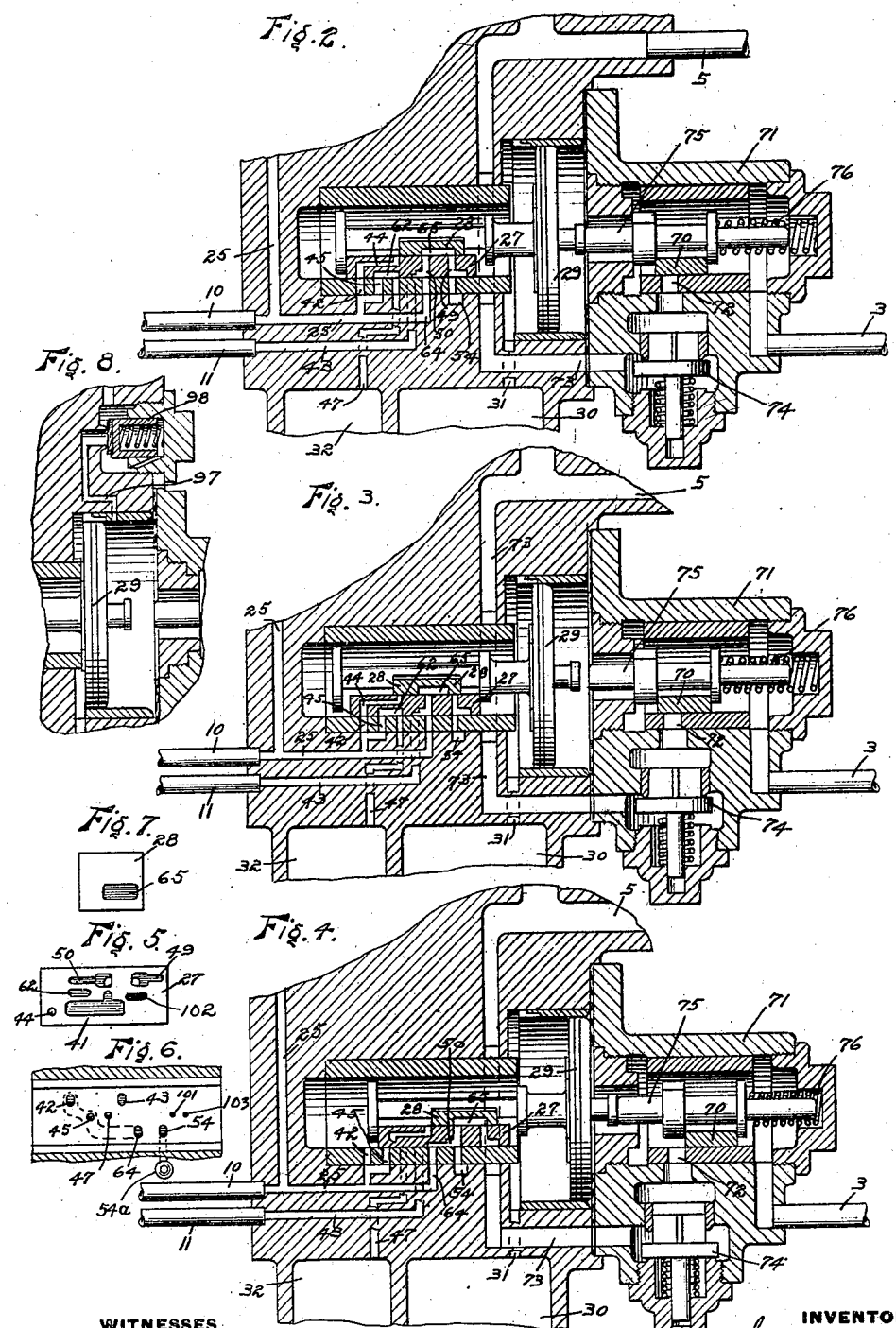
WITNESSES
INVENTOR
Walter V. Turner
by E. Wright Att'y.

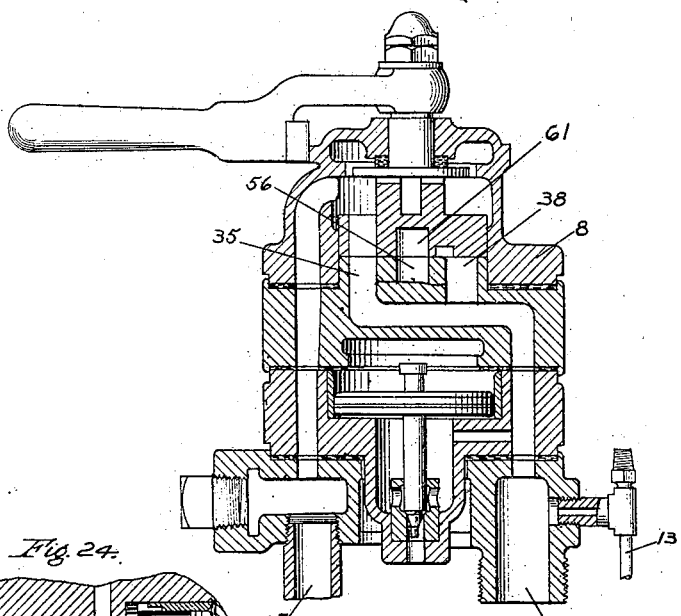
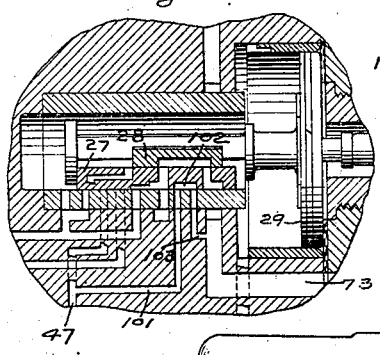
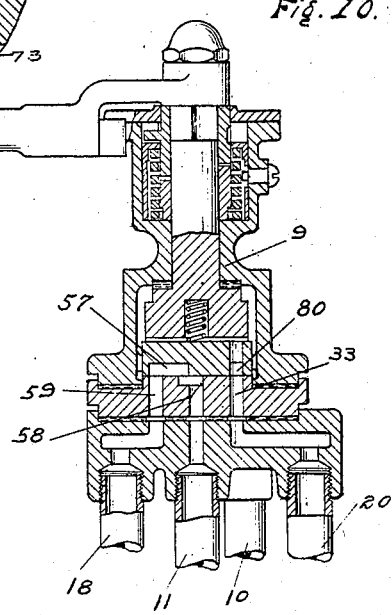

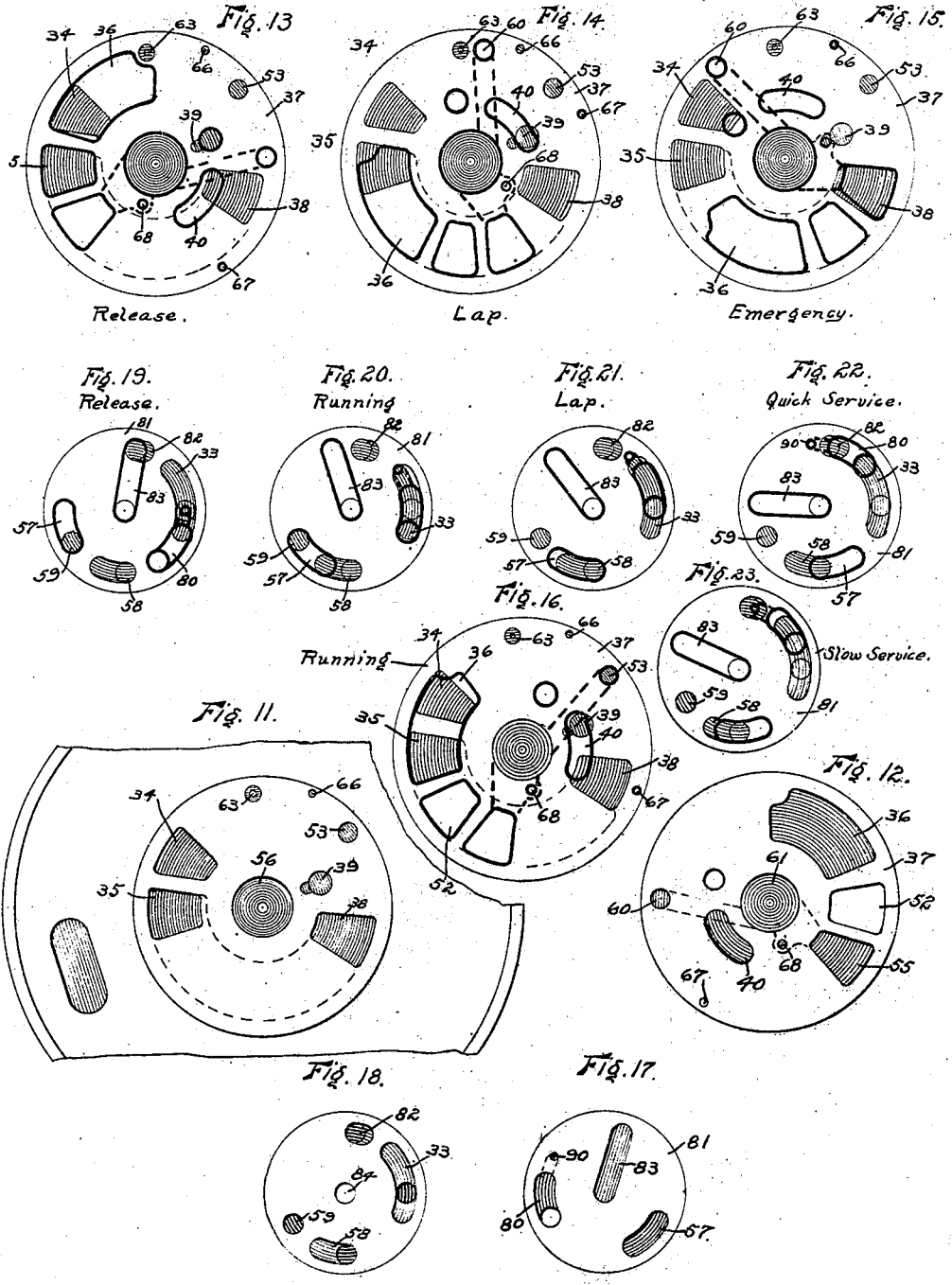

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE FOR LOCOMOTIVES.

1,130,448.  Specification of Letters Patent.  Patented Mar. 2, 1915.

Application filed November 8, 1907. Serial No. 401,243.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes for Locomotives, of which the following is a specification.

This invention relates to fluid pressure brakes for locomotives and other railway vehicles, and more particularly to a brake apparatus, an improved form of which is covered by my prior pending application, Ser. No. 287,527, filed Nov. 15, 1905, and known as the "E. T." locomotive brake equipment.

One object of my invention is to simplify certain parts of the apparatus, and to improve the operation in some respects.

Another object contemplates cutting off the application chamber of the distributing valve mechanism, from the application cylinder upon an emergency application of the brakes, so that the pressure chamber thereof equalizes into the application cylinder alone, which, being of relatively small volume, permits of a more rapid equalization at a higher degree of pressure of the fluid in the pressure chamber, thereby producing a correspondingly quick application of the brakes.

Another object of my improvements is to provide means in the engineer's brake valve for maintaining the pressure in the application cylinder in an emergency application of the brakes, thereby eliminating the maintaining port in the equalizing valve portion of the distributing valve mechanism.

Another object is to provide means, adapted to be applied to the equalizing valve portion of the distributing valve mechanism, for venting fluid from the train pipe to produce quick action in an emergency application of the brakes.

Another object of my invention is to provide improved means for controlling the brakes in double heading, wherein the application cylinder exhaust from the equalizing valve of the distributing valve is controlled by the independent brake valve, and also by the engineer's brake valve in such manner that this exhaust is open in one position, such as running position, but closed in other positions, such as release position of the engineer's brake valve for holding the engine brake applied while releasing the train brake; and also whereby this exhaust may be closed by the independent brake valve when the same is manipulated by the engineer for operating his engine brake independently of the train brakes.

Another object is to provide means for automatically operating the brakes on a dead engine in a train with the automatic train brakes.

Another object is to provide means for supplying fluid under pressure to the application chamber, upon an emergency application of the brakes, to prevent a reduction in application cylinder pressure to the application chamber upon releasing the automatic brakes, so that the engine brakes may be readily held applied and the train brakes released if desired.

In the accompanying drawings, Figure 1 is a diagrammatic view of a locomotive brake apparatus, with a preferred form of my improvements applied thereto, showing the distributing valve mechanism in section; Fig. 2 a diagrammatic sectional view of the triple valve portion of the distributing valve mechanism, with the parts in service application position; Fig. 3 a similar view, showing the parts in service lap position; Fig. 4 a similar view, showing the parts when in the emergency application position; Fig. 5 a face view of the main slide valve of the triple valve device of the distributing valve mechanism; Fig. 6 a plan view of the main slide valve seat; Fig. 7 a face view of the auxiliary slide valve adapted to be mounted on the main slide valve and have a movement relative thereto; Fig. 8 a sectional view of a portion of the triple valve device, showing one construction for supplying air from the train pipe to the main reservoir on a dead engine; Fig. 9 a sectional view of the engineer's brake valve; Fig. 10 a similar view of the straight air or independent brake valve; Fig. 11 a plan view of the rotary valve seat in the engineer's brake valve; Fig. 12 a face view of the rotary valve of the engineer's brake valve, showing the location of ports and cavities; Figs. 13 to 16 inclusive, diagrammatic views, illustrating the relative positions of the ports of the engineer's brake valve in release, lap, emergency and running positions, respectively; Fig. 17 a face view of the rotary valve for the independent brake valve; Fig. 18 a plan view of the valve seat for the independent brake valve; Figs. 19 to 23 inclusive, diagrammatic views illustrating the relative positions of the ports of the independent brake valve in release, running, lap, quick service, and slow service positions respectively, and Fig. 24 a sectional view of a portion of the triple valve device, illustrating one construction for supplying air to the application chamber in an emergency application of the brakes.

The apparatus illustrated in Fig. 1 of the drawings comprises a distributing valve mechanism 1, connected to train pipe 2, by branch pipe 3; to brake cylinder 4, by pipe 5; to main reservoir 6, by pipe 7; and to engineer's brake valve 8 and independent brake valve 9, by pipes 26, 10 and 11. The engineer's brake valve is connected to the equalizing reservoir 12 by pipe 13; to train pipe 2 by pipe 14; to main reservoir 6 by pipe 15; and also by pipe 16, through the feed valve 17; and to the independent brake valve 9 by pipe 18. The independent brake valve is connected to the main reservoir by pipe 20, containing the reducing valve 19.

The distributing valve mechanism comprises an application valve portion, having a piston 23 located in application cylinder 33ª, for actuating the application or brake cylinder supply valve 21, and exhaust valve 22 in chamber 24, which communicates with the brake cylinder or cylinders 4, through pipe 5; and an equalizing valve portion having a piston 29 for operating the main or equalizing slide valve 27 and auxiliary slide valve 28 in the valve chamber, the equalizing piston being subject on one side to the pressure of the train pipe, and on the other to that of the pressure chamber 30, which communicates through port 31 with the valve chamber.

In the main valve seat are located ports 42, 45 and 64, all communicating through passage 25 with the application cylinder 33ª and with the pipe 10, port 47, leading to the application chamber 32, port 43 communicating with pipe 11, and port 54 leading to a safety valve connection.

The rotary valve seat of the engineer's brake valve is provided with ports 35 and 38, communicating with the train pipe, port 34, communicating with the feed valve pipe 16, ports 39 and 63, leading to the equalizing reservoir chamber, exhaust port 56, port 53, leading to pipe 18, and port 66, communicating by pipe 26 and passage 25 with the application chamber of the distributing valve, while the rotary valve 37 has through ports 52 and 67, cavities 36, 40 and the exhaust cavity with which ports 55, 60, 61 and 68 communicate.

In the seat of the independent brake valve are located the ports 33, 58, 59 and 82, communicating respectively with supply pipe 20, pipe 11, connected to the exhaust from the equalizing portion of the distributing valve, pipe 18, leading to the engineer's brake valve, and pipe 10, connected to passage 25 and the application cylinder, and exhaust port 84, the rotary valve 81 being provided with a through port 80 and cavities 57 and 83.

The main reservoir being charged in the usual manner, and the brake valve being in running position, air flows through the reducing valve 19 and pipe 20 to the supply port 33 in the straight air brake valve, and also through feed valve 17 and pipe 16 to the feed port 34, in the engineer's brake valve, which port is connected, in this position, by cavity 36 in the rotary valve 37, with the train pipe port 35, thus charging the train pipe to the desired standard degree of pressure. The equalizing reservoir 12 is also connected through pipe 13, port 39 and cavity 40 in the rotary valve with train pipe port 38, charging the equalizing reservoir to standard pressure. Air flows from the train pipe, through the usual feed groove around the equalizing valve piston 29 to the slide valve chamber, and through a passage 31 to the pressure chamber 30, charging the same to the standard train pipe pressure. The equalizing valve device then occupies its normal release position, in which a cavity 41 in the main slide valve 27 connects port 42, leading to passage 25 and the application cylinder 33ª, and port 47, leading to the application chamber 32, with exhaust port 43, leading to pipe 11. In the running position of the straight air brake valve, a cavity 57 therein, connects port 58, leading to pipe 11, with port 59, leading to pipe 18, and pipe 18 opens into port 53 of the engineer's brake valve. In the running position of the engineer's brake valve, port 53 is connected by port 60, in the rotary valve, opening into the central cavity 61, with exhaust port 56, so that the application chamber and the application cylinder are open to the atmosphere, and the abutment 23 therefore occupies its normal brake release position, as will be readily understood.

In order to make a service application of the automatic brake, the engineer's brake valve is turned to service application position, in which the port 60 of the exhaust cavity in the rotary valve registers with the preliminary exhaust port 63, whereby the desired reduction in the pressure of the equalizing reservoir is effected in the usual way, after which the brake valve is turned to lap position and the equalizing discharge valve of the engineer's brake valve then operates to reduce the train pipe pressure to the same degree, in the usual manner. This reduction in train pipe pressure causes the equalizing piston 29 of the distributing valve to shift the main slide valve 27 and the auxiliary valve 28 to the service application position, as shown in Fig. 2, in which the port 44 is uncovered and air is supplied from the pressure chamber 30 to port 42, leading to the application cylinder, and also to port 45, which is now connected, by cavity 62 in the main slide valve, with port 47, leading to the application chamber 32. The pressure in the pressure chamber is in this manner reduced by expansion into the application chamber and cylinder, until it is substantially equal to or slightly less than that of the train pipe, whereupon the equalizing piston 29 moves the auxiliary or graduating valve 28 to service lap position and closes the service port 44, as illustrated in Fig. 3. The desired degree of pressure being thus admitted to the application cylinder, the piston 23 is actuated to close the brake cylinder exhaust valve and open the application or supply valve 21, whereupon air from the main reservoir flows to the brake cylinder until the pressure therein, acting upon the piston 23, substantially equals that admitted to the application cylinder upon the opposite face of said piston, then with the assistance of the spring the piston moves the application valve 21 to close the supply port, but does not move the valve 22 to open the exhaust port, this operation being substantially the same as that described in my prior application previously referred to.

The application chamber may be connected to a blow down or safety valve, so as to limit the degree of pressure therein in service applications to the desired amount. For this purpose port 54, leading to a blow down valve, 54ª, as shown in Fig. 6 is connected in service position through port 49 in the main slide valve, cavity 65 in the auxiliary valve 28, and port 50, with port 64, leading to the application cylinder, and open in this position to the application chamber. It is also evident that the ordinary automatic service application of the brakes upon the cars of the train will be effected by this reduction in train pipe pressure in the usual manner.

In order to release both the train and the engine brakes, the brake valve handle is turned to full release position for a limited period of time, and then to running position. In full release position, as shown in Fig. 13. air from the main reservoir flows through ports 52 and 35, directly to the train pipe, so that the triple valves upon the cars of the train move to release position in the usual manner. The increase in train pipe pressure also acts upon the piston 29 of the equalizing valve portion of the distributing valve, and causes the same to move valves 27 and 28 to release position, Fig. 1, in which communication is established from the application chamber 32 and application cylinder 33ª through ports 25, 42 and 47, exhaust cavity 41, port 43 and pipe 11 to port 58 in the independent brake valve, thence through cavity 57, port 59 and pipe 18 to port 53 of the engineer's brake valve, which being closed by the rotary in release position, Fig. 13, prevents the escape of air from the application chamber and cylinder and holds the engine brake applied.

When the engineer's brake valve is turned to running position, Fig. 16, the port 60 of the exhaust cavity in the rotary valve 37 registers with port 53, thereby permitting the release of air from the application chamber and cylinder, whereupon the brake cylinder pressure returns the application piston 23 and exhaust valve 22 to release position, and the brake cylinder pressure is released to the atmosphere.

If it be desired to hold the engine brake applied at the time of releasing the brakes on the cars of the train, the engineer's brake valve is moved from the release position to an intermediate or holding position, instead of to running position, so that the port 53 is held closed and the pressure retained. The engine brakes may then be graduated off as desired, by moving the engineer's brake valve alternately to running position and to holding position, as will be readily understood, the train pipe being recharged in both positions through the feed valve pipe 16 and ports 34 and 35 and cavity 36 in the engineer's brake valve.

For an emergency application of the brakes, the engineer's brake valve is turned to the emergency position, Fig. 15, in which direct communication is opened from train pipe port 38, through ports 55 and 61 of the exhaust cavity, to the main exhaust port 56. The usual sudden reduction in train pipe pressure follows, causing the triple valves on the cars of the train to move to the emergency position. It also causes the equalizing valve piston 29 of the distributing valve to make its full traverse to the emergency position, as shown in Fig. 4, in which the main slide valve 27 uncovers the port 42, so that fluid under pressure flows in large volume from the pressure chamber directly to the application cylinder 33 and the piston 23. It will now be noted that in this position, the port 47, leading to the application chamber 32 is closed, and is therefore cut off from the application cylinder, and consequently, by reason of the comparatively small volume of the application cylinder, the fluid in the pressure chamber equalizes very rapidly into the application cylinder and at a high degree of pressure, to which the application piston 23 quickly responds, to admit fluid to the brake cylinder at a corresponding degree of pressure.

The pressure in the application cylinder may now be maintained or slowly increased by means of a port 66 in the rotary valve seat of the engineer's brake valve, which is connected, in the emergency position, Fig. 15, with a small or restricted port 67 in the rotary valve, so that air from the main reservoir is supplied to the port 66 and thence, through pipe 26, pipe 10, and passage 25, to the application cylinder. The application cylinder may also be connected to the blow down valve in emergency position, as shown in Fig. 4, wherein the blow down valve port 54 is connected by cavity 50, in the main slide valve, with port 64, leading to passage 25 and the application cylinder, thereby permitting a gradual blowing down of the excess pressure.

The restricted supply port 67 in the engineer's brake valve is preferably designed of such size with reference to that of the port leading to the blow down or safety valve, that when the application cylinder pressure has reached about 75 pounds per square inch, the inflow from the high main reservoir pressure is about equal to the outflow to the safety valve and the application cylinder pressure will be maintained at that point. If the pressure produced in the application chamber in an emergency application should be less than this amount it would be gradually increased by the inflow from the main reservoir; while if the initial pressure should be greater than this amount, as it would be in high speed brake service, it would then be gradually reduced to this point by the more rapid outflow through the safety valve. The small outlet port, leading to the safety valve, is made of such size as to permit the excess pressure to escape as rapidly as it accumulates in the application chamber in service applications, thereby limiting said pressure to the desired maximum degree for which the safety valve is adjusted.

In order to facilitate quick action of the automatic train brakes in emergency applications, a valve device for locally venting the train pipe on the locomotive may be provided as shown in the drawings, and comprising a casing 71, which may be secured to the equalizing valve portion of the distributing valve in place of the usual piston chamber cap. The casing 71 is provided with a valve chamber open to train pipe pressure and contains a slide valve 70, for governing a train pipe vent port 72, preferably connected to the brake cylinder by passage 73. The passage 73 may be provided with a check valve 74 to prevent back flow from the brake cylinder to the train pipe.

The vent valve 70 is adapted to be operated by the usual spring stem 75, the spring 76 of which, tends to maintain the valve in its closed position normally. When an emergency application of the brakes is made, the piston 29 moves to its emergency position, compressing the spring 76 and causing the stem 75 to shift the vent valve 70 to its open position, in which air is vented from the train pipe to the brake cylinder, thus causing a local reduction in the train pipe pressure and thereby facilitating quick action of the automatic train brakes.

In the case of a quick action valve device employed in connection with the ordinary automatic triple valve device, it is preferable to somewhat retard the flow of air from the auxiliary reservoir to the brake cylinder, in order to permit of a free flow of air from the train pipe to the brake cylinder when an emergency application of the brakes is effected.

With the present construction, it will be noted that the immediate action of the equalizing valve device in moving to its emergency position, is to open the train pipe vent valve, while admitting fluid to the application piston, which is then operated to admit air from the main reservoir to the brake cylinder.

The locomotive brakes may be independently operated by means of the independent brake valve 9, and in order to apply the engine brakes, this valve is turned to application position, Fig. 22, in which cavity 80 in the rotary valve 81 connects supply port 33 and pipe 20, leading from the main reservoir through the reducing valve 19, with port 82, leading to pipe 10, passage 25 and the application cylinder, which is open to the application chamber 32, the equalizing valve being in release position. Communication is cut off from the automatic brake valve by this movement, so that the pressure may be raised in the application chamber and application cylinder to the desired degree, thereby operating the abutment 23 to supply air to the brake cylinder at a corresponding degree of pressure. The brake valve may then be turned to lap position, Fig. 21, and the engine brakes held applied.

The brake cylinder pressure may be graded down or released by turning the independent brake valve to release position, Fig. 19, in which the application cylinder port 82 is connected to the exhaust port 84, by cavity 83. The engine brakes may also be released by turning the independent brake valve to running position, Fig. 20, in which the application cylinder is open to the atmosphere through pipe 11, port 58, cavity 57 in the independent rotary valve 81, port 59, pipe 18, port 53, and cavity 60, in the rotary valve of the engineer's brake valve, which is open to exhaust port 56, in the running postion thereof.

I preferably provide two application positions for the independent brake valve, one in which the supply port 33 is fully open to the application cylinder, to secure a quick application, as shown in Fig. 22, and the other in which a restricted port 90, connects the supply port with the application cylinder port, to secure a more gradual application of the brakes, as shown in Fig. 23. It will also be apparent that, when the brake is applied with the automatic system, the pressure in the application cylinder and the corresponding engine brake cylinder pressure may be readily reduced, or entirely released as desired, by the manipulation of the independent brake valve to the desired position.

According to my present improvements, when two or more engines are used for hauling a train, commonly called double heading, the engineer's brake valve handle is placed in running position on the second or helper engine, and the cut out cock 91 in the train pipe branch 14 is closed. In running position of the engineer's brake valve the pipe 11 is open to the exhaust through cavity 57 in the independent brake valve, pipe 18, port 53 and exhaust cavity 60, as before described. The brakes on the second engine may, therefore, be applied and released with the automatic train brakes by operation of the engineer's brake valve on the head engine in the usual way. If the engineer on the second engine desires to apply or release the brakes on his engine independently, the independent brake valve may be operated for that purpose, the same as in other cases, as will be apparent.

When an engine is hauled in a train as a dead engine, it is desirable that the brakes on that engine should apply and release with the train brakes, when the automatic system is operated in the usual manner. For this purpose I may provide a branch pipe 93 connecting the main reservoir pipe 15 with the train pipe 2. This pipe contains a cock 94 for normally closing the pipe 93. Thus, by opening the cock 94 on the dead engine in the train, the train pipe supplies air through the pipes 93 and 15 to the main reservoir, so that the engine distributing valve mechanism is supplied with air and operates in the usual way with an automatic application or release of the train brakes. The pipe 93 is preferably provided with a check valve 96 to prevent return flow of air from the main reservoir to the train pipe. Another form of device for accomplishing this purpose is illustrated in Fig. 8. In this construction, a passage 97 is provided, leading from the piston chamber of the triple valve piston 29 to the main reservoir, and containing a spring pressed valve 98, the valve being subject on one side to train pipe pressure and on the other side to main reservoir pressure, and being adapted to seat toward the train pipe side. Ordinarily the main reservoir pressure is higher than the train pipe pressure, so that the valve 98 is firmly held to its seat by the main reservoir pressure, but with a dead engine, the main reservoir contains no initial pressure, and the train pipe pressure thereupon lifts the valve 98 from its seat, charging the main reservoir to substantially train pipe pressure. The port 97 may be located in the piston chamber, so that the movement of the piston to application position will cut off communication from the train pipe. Thus, in case of a leaky valve, possible flow of air from the main reservoir to the train pipe is prevented, obviating any tendency to thereby increase the train pipe pressure and release the brakes.

In some instances, it may be desirable to hold or maintain the engine brakes applied, while releasing the train brakes, after an emergency application of the brakes. This result may be readily effected by turning the independent brake valve to a position in which the release connections to the application cylinder are closed, as, for instance, service or lap position, then, upon movement of the equalizing valve of the distributing valve to release position, the air in the application cylinder is retained and the engine brakes are held applied. It is obvious that this same result may be obtained by manipulation of the engineer's brake valve, with the independent brake valve in running position, by turning the same from release to holding position, in the same way as hereinbefore described in connection with a service application of the brakes.

By reason of the application chamber being cut off from the application cylinder in an emergency application of the brakes, the chamber may be at atmospheric pressure, and consequently, upon return of the triple valve to release position, in which the chamber is open to application cylinder, the cylinder pressure may be reduced by expansion into the chamber so as to partially release the engine brakes. If it should be desired to prevent this reduction in pressure, I may provide a construction, such as illustrated in Fig. 24, wherein in the emergency position of the equalizing valve device, the application chamber is connected to a source of pressure, such as the brake cylinder. For this purpose a passage 101 may be provided, opening to the main slide valve seat and leading to the passage 47 and the application chamber.

In the emergency position a cavity 102, in the main slide valve, connects the passage 101 with a passage 103, which opens into the brake cylinder passage 73. Thus, air from the brake cylinder is charged into the application chamber during the application, so that the pressure in the application chamber and in the application cylinder are substantially equal, and there will be no reduction of pressure in the latter by expansion into said chamber when the equalizing valve is returned to release position. With this feature of my improvement, it will be observed that the full emergency brake cylinder pressure may be retained on the engine while releasing the brakes upon the train, as before described.

By means of the simplified and improved pipe connection between the two brake valves and the distributing valve, it will now be apparent that the application cylinder pressure and the corresponding engine brake cylinder pressure may be readily graded down or released by the use of either brake valve, when the equalizing portion of the distributing valve is in release position, by controlling the exhaust passage from the equalizing valve; while at the same time the independent brake valve may be manipulated at any time to hold this exhaust closed and to operate the engine brakes independently of the train brakes, and thereby avoiding the necessity of using a separate cut out cock in the exhaust passage or pipe from the equalizing valve portion of the distributing valve.

Having now described my invention, what I claim as new and desire to secure by Letters Patent is:—

1. In a fluid pressure brake, the combination with a chamber containing a movable abutment or piston, the admission of pressure to which causes the application of the brakes, of another chamber normally in open communication with said piston chamber in service applications, and means for automatically closing communication between said chambers in emergency applications of the brakes.

2. In a fluid pressure brake, the combination with a chamber containing a movable abutment or piston, operated by an increase in fluid pressure for supplying air to the brake cylinder, of another chamber and automatic valve device for supplying fluid under pressure to both chambers in one position, but only to the piston chamber in another position.

3. In a fluid pressure brake, the combination with a chamber containing a movable abutment or piston, the admission of pressure to which causes the application of the brakes, of another chamber and a valve device subject to variations in train pipe pressure and operating in service applications to supply fluid to both chambers, and in emergency applications to cut off the second chamber from the piston chamber and supply fluid to the latter chamber.

4. In a fluid pressure brake, the combination with a chamber containing a movable abutment or piston, the admission of pressure to which causes the application of the brakes, and another chamber normally communicating with said piston chamber, of an auxiliary pressure chamber, and valve means for opening communication from said auxiliary chamber to both the other chambers in service applications, but adapted to cut off the second chamber and open communication from the auxiliary chamber to the piston chamber in emergency applications of the brakes.

5. In a fluid pressure brake, the combination with a chamber containing a movable abutment or piston, the admission of pressure to which causes the application of the brakes, and another chamber normally communicating with said piston chamber, of an auxiliary pressure chamber, and a valve device operated by variations in train pipe pressure and adapted to open communication from the auxiliary chamber to both the other chambers in service application position, but adapted to cut off said second chamber from the piston chamber and open communication from the auxiliary chamber to the said piston chamber in emergency application position.

6. In a fluid pressure brake, the combination with a brake cylinder, of a valve for controlling the supply of air to the brake cylinder, a movable abutment for actuating said valve, an application chamber, and means for supplying air to said movable abutment, in one position, with the application chamber open to the abutment, and in another position, with said application chamber cut off from the abutment.

7. In a fluid pressure brake, the combination with a brake cylinder, of a valve for controlling the supply of air to the brake cylinder, a movable abutment for actuating said valve, an application chamber, and means for supplying air to said movable abutment, in service position, with the application chamber open to the abutment, and in emergency application position, with said application chamber cut off from the abutment.

8. In a fluid pressure brake, the combination with a brake cylinder, of a valve for controlling the supply of air to the brake cylinder, a movable abutment for actuating said valve, an application chamber, and means operated by a gradual reduction in train pipe pressure for supplying air to said movable abutment, with the application chamber open to the abutment, and operated by a sudden reduction in train pipe pressure for supplying air to said movable abutment, with the application chamber cut off from the abutment.

9. In a fluid pressure brake, the combination with a brake cylinder, of a valve for controlling the supply of air to the brake cylinder, a movable abutment for actuating said valve, an application chamber, and means operated by a gradual reduction in train pipe pressure for supplying air to said movable abutment, with the application chamber open to the abutment, and operated by a sudden reduction in train pipe pressure, for supplying air to said movable abutment, and for cutting off communication from the application chamber to said movable abutment.

10. In a fluid pressure brake, the combination with a brake cylinder, of a valve for controlling the supply of air to the brake cylinder, a movable abutment for actuating said valve, an application chamber, a pressure chamber, and an automatic valve device for supplying air from said pressure chamber to said movable abutment in service application position, with the application chamber open to said abutment, and for supplying air from said pressure chamber to the movable abutment, and for cutting off communication from the application chamber to said abutment in emergency application position.

11. In a fluid pressure brake, the combination with a brake cylinder, train pipe, engineer's brake valve, and a source of fluid under pressure, of a valve for controlling the supply of air to the brake cylinder, a movable abutment for governing said valve, a pressure chamber and an automatic valve device for supplying air from said pressure chamber to said movable abutment upon a reduction in train pipe pressure to apply the brakes, the engineer's brake valve having ports for supplying air from the main reservoir to said movable abutment, in emergency application position.

12. In a fluid pressure brake, the combination with a train pipe, brake cylinder, and an application valve device for controlling the supply of fluid to the brake cylinder, of an automatic valve device, subject to variations in train pipe pressure for controlling the supply of fluid to said application valve device, an independent brake valve controlling said application valve device and an engineer's brake valve for controlling the train pipe pressure and having means for supplying fluid to said application valve device in emergency position independently of the position of the independent brake valve.

13. In a fluid pressure brake, the combination with a train pipe, brake cylinder, and an application valve device for controlling the supply of fluid to the brake cylinder, of an automatic valve device, subject to variations in train pipe pressure for controlling the supply of fluid to said application valve device, and a brake valve for controlling the train pipe pressure and having a port for supplying fluid from the main reservoir to the application valve device in emergency position.

14. In a fluid pressure brake, the combination with a main reservoir, train pipe, brake cylinder, and application valve for controlling the supply of fluid to the brake cylinder, and a chamber containing a movable abutment or piston for governing the operation of the application valve, of an automatic valve device subject to variations in train pipe pressure for supplying fluid to said application chamber, a brake valve for controlling the train pipe pressure and having a port for supplying fluid from the main reservoir to the application chamber in emergency position, and a blow down valve adapted to communicate with said application chamber.

15. In a fluid pressure brake, the combination with a train pipe, brake cylinder, and a valve mechanism operating in response to variations in train pipe pressure for effecting the application and release of brakes, of an engineer's brake valve for controlling the train pipe pressure and the exhaust from said valve mechanism, and an independent brake valve for controlling the exhaust from said valve mechanism independently of the engineer's brake valve.

16. In a fluid pressure brake, the combination with a train pipe, brake cylinder, and a valve mechanism operating in response to variations in train pipe pressure for effecting the application and release of brakes, of an engineer's brake valve having means for controlling the train pipe pressure and the exhaust from said valve mechanism, and another brake valve having means for effecting an independent application of the brakes and for also having a direct exhaust port for controlling the exhaust from said valve mechanism.

17. In a fluid pressure brake, the combination with a train pipe, brake cylinder, and a valve mechanism operating in response to variations in train pipe pressure for effecting the application and release of brakes, of an engineer's brake valve for controlling the train pipe pressure, and an independent brake valve, either brake valve having means for opening the exhaust from said valve mechanism, when the other brake valve is in running position.

18. In a fluid pressure brake, the combination with a chamber containing a movable abutment or piston, the admission or the release of pressure to and from which causes the application and the release of the brakes, of an automatic valve device, operated by variations in train pipe pressure for controlling the pressure in said chamber, an engineer's brake valve for governing the train pipe pressure, and an independent brake valve for also controlling the pressure in said chamber, both brake valves having means for controlling the exhaust from said automatic valve device.

19. In a fluid pressure brake, the combination with a chamber containing a movable abutment or piston, the admission of pressure to which causes the application of the brakes, of an additional chamber normally in open communication with said piston chamber in service applications, and means for automatically cutting off said communication in emergency applications of the brakes, and for admitting air to said additional chamber.

20. In a fluid pressure brake, the combination with a chamber containing a movable abutment or piston, the admission of pressure to which causes the application of the brakes, of an additional chamber normally in open communication with said piston chamber in service applications, and an automatic brake valve device for supplying fluid under pressure from the same source of pressure to both chambers in one position, but from different sources of pressure in another position.

21. In a fluid pressure brake, the combination with a chamber containing a movable abutment or piston, the admission of pressure to which causes the application of the brakes, and an additional chamber normally communicating with said piston chamber, of an auxiliary pressure chamber, and valve means for opening communication from said auxiliary chamber to both the other chambers in service applications, but adapted to cut off said additional chamber and open communication from the auxiliary chamber to the piston chamber and from another source of pressure to the additional chamber in emergency applications of the brakes.

22. In a fluid pressure brake, the combination with a brake cylinder, of an application chamber, a valve mechanism governed by the pressure in said chamber for controlling the supply of air to the brake cylinder, an automatic valve device for controlling the admission of air to and its release from said application chamber, an engineer's brake valve, and a cock for closing communication from the train pipe to the engineer's brake valve, said engineer's brake valve having means for controlling the exhaust from the automatic valve device.

23. In a fluid pressure brake, the combination with a brake cylinder, of a valve for controlling the supply of air to the brake cylinder, a movable abutment for governing said valve, means operated by variations in train pipe pressure for supplying air to said movable abutment, and a valve mechanism operating upon a sudden reduction in train pipe pressure to vent air from the train pipe to the brake cylinder.

24. In a fluid pressure brake, the combination with a train pipe, a brake cylinder and a source of fluid pressure from which air is supplied to operate the brakes on an engine, of a valve for controlling the supply of air from said source of supply to said brake cylinder, a movable abutment for actuating said valve, a valve device operated by variations in train pipe pressure for controlling the fluid pressure on said abutment, and means for charging said source of fluid under pressure from the train pipe, whereby the brakes on the engine may be operated with the train brakes when there is no power on the engine.

In testimony whereof I have hereunto set my hand.

WALTER V. TURNER.

Witnesses:
R. V. EMERY,
WM. M. CADY.